US008096868B2

(12) United States Patent
Trainor et al.

(10) Patent No.: US 8,096,868 B2
(45) Date of Patent: Jan. 17, 2012

(54) GAMING METHOD AND MACHINE WITH BONUS GAME

(75) Inventors: Bethany Joy Trainor, Dieppe (CA); P. Jay Alexander, Greater Lakeburn (CA)

(73) Assignee: Spielo Manufacturing ULC, Moncton, New Brunswick (CA)

( * ) Notice: Subject to any disclaimer, the term of this patent is extended or adjusted under 35 U.S.C. 154(b) by 1103 days.

(21) Appl. No.: 11/242,721

(22) Filed: Oct. 3, 2005

(65) Prior Publication Data

US 2006/0079313 A1 Apr. 13, 2006

Related U.S. Application Data

(60) Provisional application No. 60/615,434, filed on Oct. 1, 2004.

(51) Int. Cl.
*A63F 13/00* (2006.01)

(52) U.S. Cl. .......................................................... 463/20

(58) Field of Classification Search ............... 463/16–20
See application file for complete search history.

(56) References Cited

U.S. PATENT DOCUMENTS

| | | | | |
|---|---|---|---|---|
| 6,544,120 | B2 * | 4/2003 | Ainsworth | 463/20 |
| 2002/0014740 | A1 | 2/2002 | Ainsworth | |
| 2002/0055382 | A1 | 5/2002 | Meyer | |
| 2003/0157981 | A1 * | 8/2003 | Marks et al. | 463/20 |
| 2004/0023707 | A1 * | 2/2004 | Maya et al. | 463/16 |
| 2004/0127276 | A1 * | 7/2004 | Moody | 463/13 |
| 2005/0148381 | A1 * | 7/2005 | Marks et al. | 463/16 |
| 2005/0159208 | A1 * | 7/2005 | Pacey | 463/20 |

FOREIGN PATENT DOCUMENTS

| | | |
|---|---|---|
| WO | WO 03/095049 | 11/2003 |

OTHER PUBLICATIONS

International Search Report dated Feb. 9, 2006, Application No. PCT/US2005/035817.

* cited by examiner

*Primary Examiner* — David L Lewis
*Assistant Examiner* — Eric M Thomas
(74) *Attorney, Agent, or Firm* — Sullivan & Worcester LLP; Christopher T. McWhinney

(57) ABSTRACT

A method and system is provided for conducting a wagering game. A spin result is determined, the spin result including a set of symbols positioned within a set of symbol positions. The symbol positions may be arranged in rows and columns or another arrangement. The spin results and associated symbol positions may be displayed on a viewable display area. A prize associated with the spin result may be awarded. The wagering game may include a first trigger condition, a second trigger condition and an end condition. If the spin result meets the first trigger condition, additional symbol positions may be added. If the spin result meets the second trigger condition, symbol positions may be removed. If the spin result meets the end condition, the wagering game ends. If the spin result does not meet the end condition, the wagering game continues by determining a next spin result.

38 Claims, 13 Drawing Sheets

Fig. 11a

1100

| PrizeID | Prize Description | Prize Amount | Displayed Result | Date and Time of Occurance | |
|---|---|---|---|---|---|
| 1 | 2955 | $50 | x | 8/15/05 1601 | 1102 |
| 2 | 3696 | $0 | x | 8/18/05 1332 | 1102 |
| 3 | 8799 | $0 | x | 8/19/05 1233 | 1102 |
| ... | ... | ... | ... | ... | |

Fig. 11b

| 1104 | 1106 | 1108 | 1110 | 1112 | |
|---|---|---|---|---|---|
| 1 | 6351 | $50 | x | 8/15/05 1601 | 1102' |

GAMING METHOD AND MACHINE WITH BONUS GAME

RELATED APPLICATION AND PRIORITY CLAIM

This application claims priority under 35 U.S.C. 119 to U.S. provisional application 60/615,434 filed Oct. 1, 2004. The entire contents of the referenced application is incorporated herein by reference thereto.

BACKGROUND

Video gaming machines are commonly used in traditional gambling establishments such as casinos and gambling centers and in other markets such as bars, restaurants, racinos, bingo halls, riverboats, and cruise ships. While the regulations covering these different establishments are different, they also vary from one jurisdiction to another and the habits of players may also vary. Hence, a game that can attract and maintain the interest of a player provides higher value to the proprietor. Consequently, there is a need to continually improve game features, while maintaining a fairly high level of familiarity so that established players can also enjoy the new game features.

Because the number of games allowed within an establishment is typically regulated and because the gaming machines have a relatively short payback cycle, the gaming machine business is highly competitive. Hence there is further pressure on the industry to make improvements in game features that enhance their play value.

Video gaming machines provide games that fall into general categories that emulate traditional games of chance such as keno, bingo, scratch tickets, fixed-odds betting, other types of wager games, slot-machine emulation and card game emulation. These typically reward a player having a predetermined outcome with a bonus round of play or other incentives. One type of video gaming machines is a video slot machine, emulating traditional slot machine games. Traditional slot machines include a plurality of reels that rotate around a horizontal axis. An input accepts a player's input to indicate a desire to spin the reels. Symbols may be displayed on the outside of the reels so that the symbols are visible to a player when the reels come to rest. If the symbols on the reels are arranged in a pre-determined arrangement, a prize may be awarded to the player. The prize may depend on the symbol arrangement and an initial bet made by the player.

A video slot machine may include a viewable display area where a plurality of reels is simulated. The symbols may be arranged in columns and provided with an animation sequence to simulate spinning reels when a player's input is received to spin the reels.

BRIEF DESCRIPTION OF THE DRAWINGS

FIG. 11*a* illustrates an example prize table, in accordance with an example embodiment of the present invention.

FIG. 11*b* illustrates an example embodiment of a prize table entry, according to an example embodiment of the present invention.

DETAILED DESCRIPTION OF EXAMPLE EMBODIMENTS

Figure 1:
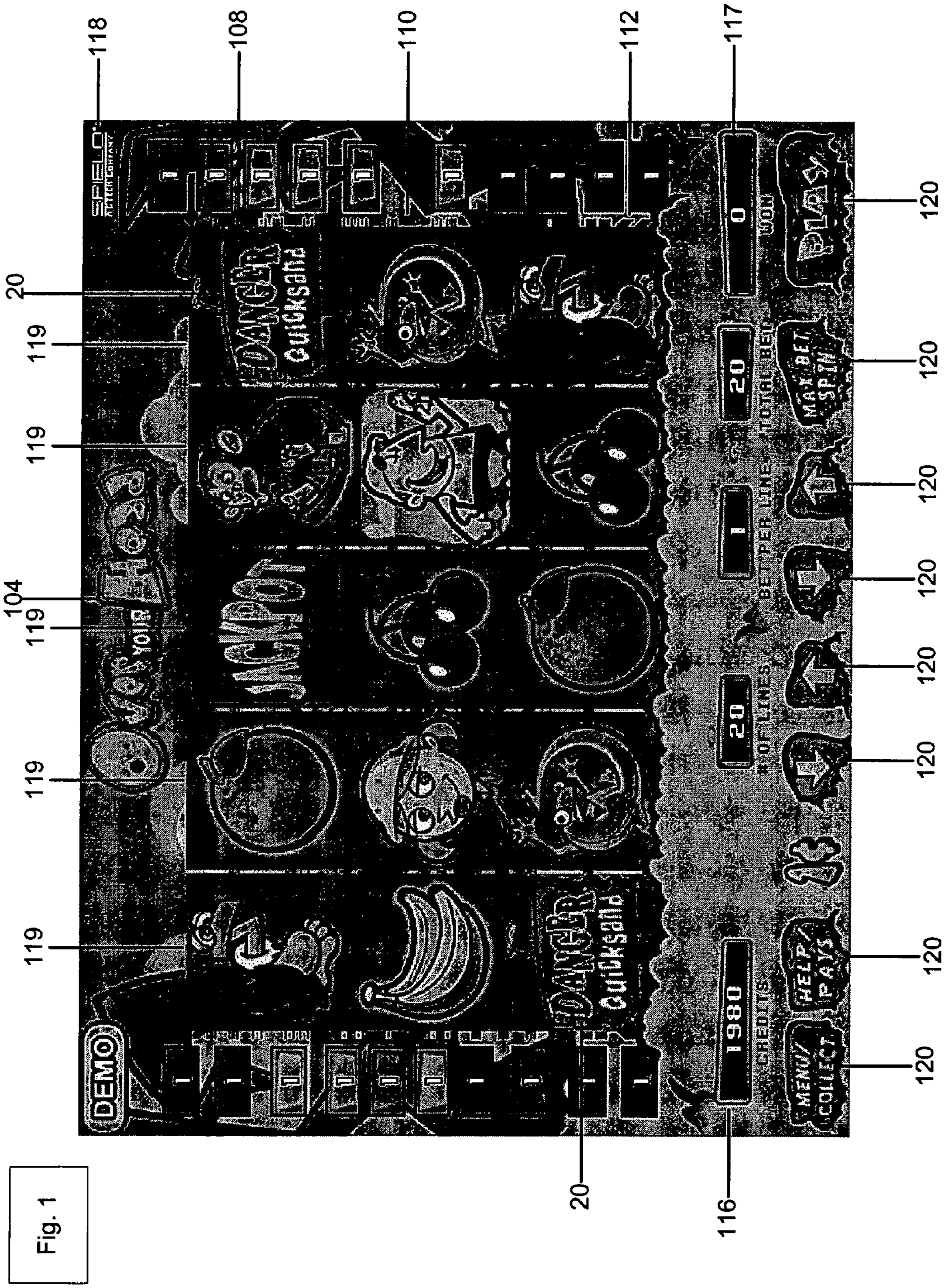
FIG. 1 illustrates an example basic game, in accordance with an example embodiment of the present invention.

In one example embodiment of the present invention, a wagering game may be provided on a video game terminal configured to simulate a slot machine. The wagering game may include a number of symbol positions, each symbol position configured to display a symbol. The symbol positions may be arranged into a number of rows. The wagering game may include a first trigger condition that adds a row of symbol positions. The wagering game may also include a second trigger condition that removes a row of symbol positions. The wagering game may also include an end condition that ends the wagering game. The wagering game may also include a varying win multiplier. For example, the wagering game may be a stand alone game provided on the video game terminal. Alternatively, the wagering game may be a bonus game included in a basic game, the bonus game triggered by a bonus outcome within the basic game. The bonus game may be terminated when an end condition occurs. While numerous variations of bonus round exist, the bonus round still offers opportunities for further innovation that may provide an advantage with regard to playability, player loyalty or profitability.

In another example embodiment of the present invention, a procedure for conducting a wagering game may be provided. A spin result including positions of symbols in a plurality of rows of symbol positions may be determined, the spin result may be displayed on a viewable display area, a prize associated with the spin result may be awarded, a row of symbol positions may be added if a first trigger condition is met, a row of symbol positions may be removed if a second trigger condition is met, the wagering game may be ended if an end condition is met. The spin result may be determined randomly. The prize may depend in part on a number of rows of symbol positions. The wagering game may be a bonus game included in a basic game and the bonus game may begin when a start-bonus outcome is detected in the basic game. A prize may be awarded for a scatter win. A scatter win may award a prize when symbols do not line up on a pay line. A majority of the symbol positions in the spin result may contain a blank symbol. The end condition may occur when a number of rows of symbol positions equals zero. The first trigger condition may be a spin result awarding a prize or displaying a predetermined number of spin results. The second trigger condition may be a spin result awarding a prize, a spin result not awarding a prize, or a special symbol included in the spin result.

In another example embodiment of the present invention, a procedure for conducting a wagering game may be provided. A spin result including positions of symbols in a plurality of rows of symbol positions may be determined, the spin result may be displayed on a viewable display area, a prize associated with the spin result may be awarded, a row of symbol positions may be added if a first trigger condition is met, a row of symbol positions may be removed if a second trigger condition is met, the wagering game may be ended if an end condition is met. The spin result may be determined randomly. The prize may depend in part on a number of rows of symbol positions. The wagering game may be a bonus game included in a basic game and the bonus game may begin when a start-bonus outcome is detected in the basic game.

In another example embodiment of the present invention, a system for conducting a wagering game is provided, the system including a variable number of rows of symbol positions displayed on a viewable display area, a first trigger condition to increase the number of rows of symbol positions, a second trigger condition to decrease the number of rows of symbol positions, and a processor configured to, determine a spin result, the spin result including positions of symbols in the rows of symbol positions, award a prize associated with the spin result, responsively increase the number of rows of symbol positions on occurrence of the first trigger condition, responsively decrease the number of symbol positions on occurrence of the second trigger condition, and end the wager game on occurrence of an end condition. The system may also include a prize table comprising a plurality of prize table entries, each prize table entry relating a prize to a spin result. The system may also include an input device, the input device configured to accept input from a player. The number of rows of symbol positions in the system may also include a number of columns of symbol positions, and the columns are animated to simulate reels on a conventional slot machine.

In another example embodiment of the present invention, a computer-readable medium storing instructions adapted to be executed by a processor, the instructions, when executed, defining a procedure for conducting a wagering game including: determining a spin result, the spin result including positions of symbols in a number of symbol positions, displaying the spin result on a viewable display area, awarding a prize associated with the spin result, increasing the number of symbol positions if a first trigger condition is met, decreasing the number of symbol positions if a second trigger condition is met, and ending the wagering game if an end condition is met.

A basic game may include a plurality of symbols randomly placed in a viewable display area relative to at least one pay line. The basic game may award a basic game payout for any winning symbol combinations along the pay line. The basic game may include a predefined start-bonus outcome, which may be a certain outcome/trigger in the main game.

A "free spins" bonus game may be triggered by the start-bonus outcome. There may be no set number of free spins upon entering the bonus game.

The reel strips may be redefined upon entering the bonus using the type of reel strips known in the art with possible variations, where the majority of the symbol positions on each reel may be blank. In one embodiment, scatter wins may be paid for all symbols that are displayed when the reels reach their final position. That is, symbols do not have to be displayed in a specified number of locations, but only the appearance of symbols is considered. For example, scatter wins may award a prize even if winning symbols do not line up on a pay line. In one embodiment, bonus game play may commence on a game space that is dynamically altered during game play, including varying grid sizes and orientations or varying cell configurations.

One example may begin the bonus game and free spins upon achieving the start-bonus outcome in the basic game. If a winning spin occurs, the free spins may continue. If a losing spin occurs, wherein there are all blanks in a particular predefined configuration, such as a 5×3 grid, the part of the configuration containing the blanks may disappear and only two rows are displayed. In this example, the spins continue, but now only a 5×2 grid is available for game play. Prizes may be doubled (2× multiplier) in value. If a special symbol is displayed, the viewable screen area may return to showing all 3 rows or a row may be added.

When the reels fall to the last level (i.e. one row onscreen), prizes may be tripled (3× multiplier) in value. A predefined outcome or special symbol may return the reels to showing 2 reels. Another predefined outcome or special symbol may return the reels to their original state, 3 rows.

Figure 1A:
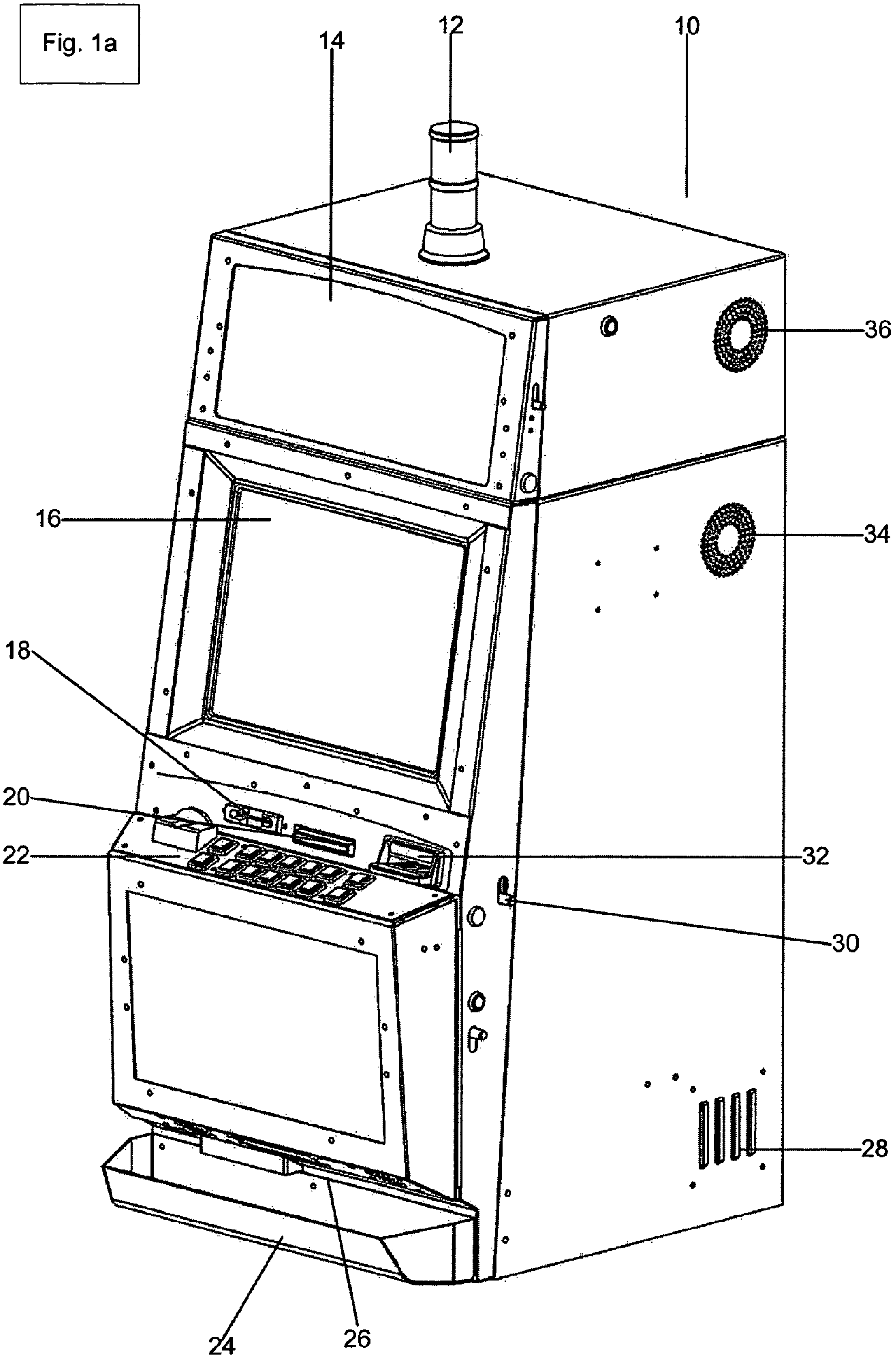
FIG. 1*a* illustrates an example video gaming machine, in accordance with an example embodiment of the present invention.

FIG. 1*a* illustrates an example video gaming machine, in accordance with an example embodiment of the present invention. A video gaming machine 10 may be configured to conduct a wagering game. For example, a wagering game may be a slot machine game, a lottery, a video game, or another game of chance involving a wager. For example, the video gaming machine 10 may be a video lottery terminal (VLT), a video slot machine, or a video game terminal. The video gaming machine 10 may be in communication with a server.

The video gaming machine 10 may include a blinker 12. The blinker 12 may enclose a light configured to blink on and off. For example, the blinker 12 may be configured to blink when a large prize is awarded from the video gaming machine 10.

The video gaming machine 10 may include a lighted display 14. For example, the lighted display 14 may include a logo, a game name or other visually attractive graphics. The lighted display 14 may alternatively be a liquid crystal display screen.

The video gaming machine 10 may include display screen 16. The display screen 16 may be a liquid crystal display screen or a CRT screen. For example, the display screen 16 may enclose a viewable display area visible to a player.

The video gaming machine 10 may include a credit card accepter 18, a player's card accepter 20 and a currency accepter 32. For example, the credit card accepter 18 may accept a credit card or a debit card for a player's wager. For example, the player's card accepter 20 may accept a frequent player's card. The frequent player's card may include a player's identifying information and wager history. Alternatively, the frequent player's card may include an identifier that is associated with a player's identifying information and wager history. The currency accepter 32 may be configured to accept cash bills in various denominations for a player's wager.

The video gaming machine 10 may include input devices 22. For example, the input devices 22 may be a set of buttons.

The input devices 22 may be configured to receive input from a player during a wagering game.

The video gaming machine 10 may include a dispenser tray 24 and a dispenser 26. The dispenser 26 may be configured to dispense a prize. For example, a prize may be currency or a prize receipt redeemable at a cashier. The dispenser tray 24 may be configured to catch the prize after it is dispensed.

The video gaming machine 10 may include openings 28, 34 and 36. Opening 28 may be configured to allow ambient air to circulate into and out of an interior of the video gaming machine 10. Openings 34 and 36 may be configured to allow sound through.

FIG. 1 illustrates an example basic game, in accordance with an example embodiment of the present invention. The basic game may be displayed on a video game terminal to a player. A start-bonus outcome in the basic game may trigger a beginning of a bonus game. The start-bonus outcome may be a variety of conditions, for example, a pre-determined outcome that may occur in the basic game. A pre-determined outcome may be a special symbol. For example, a start-bonus outcome may be a display of a special symbol, a combination of special symbols or a combination of symbols and positions. In one example embodiment, a bonus game ("Sink or Spin bonus") may be triggered by the "Danger Quicksand" symbol 20 on reels (columns) one and five 119.

The basic game may include columns of symbol positions configured to simulate reels on a conventional slot machine. The basic game may include a game title 104. The game title 104 may be a visually attractive logo. The basic game may include a manufacturer logo 118. The basic game may also include rows of symbol positions 108, 110 and 112. The basic game may also include columns of symbol positions 119. Each symbol position may be configured to display one symbol.

It will be appreciated that a total number of symbol positions may be varied. For example, rows and columns of symbol positions may be added or removed. Alternatively, the symbol positions may be arranged in other layouts.

The basic game may include a credits remaining indicator 116. The credits remaining indicator 116 may indicate how many credits the player has remaining in the game. The basic game may also include a win amount indicator 117. The win amount indicator 117 may indicate how much the player has won.

The basic game may include inputs 120. Inputs 120 may accept input from a player, for example, to trigger a help menu, increase or decrease the number of lines bet or amount of bet per line, and to trigger a spin.

Figure 2:
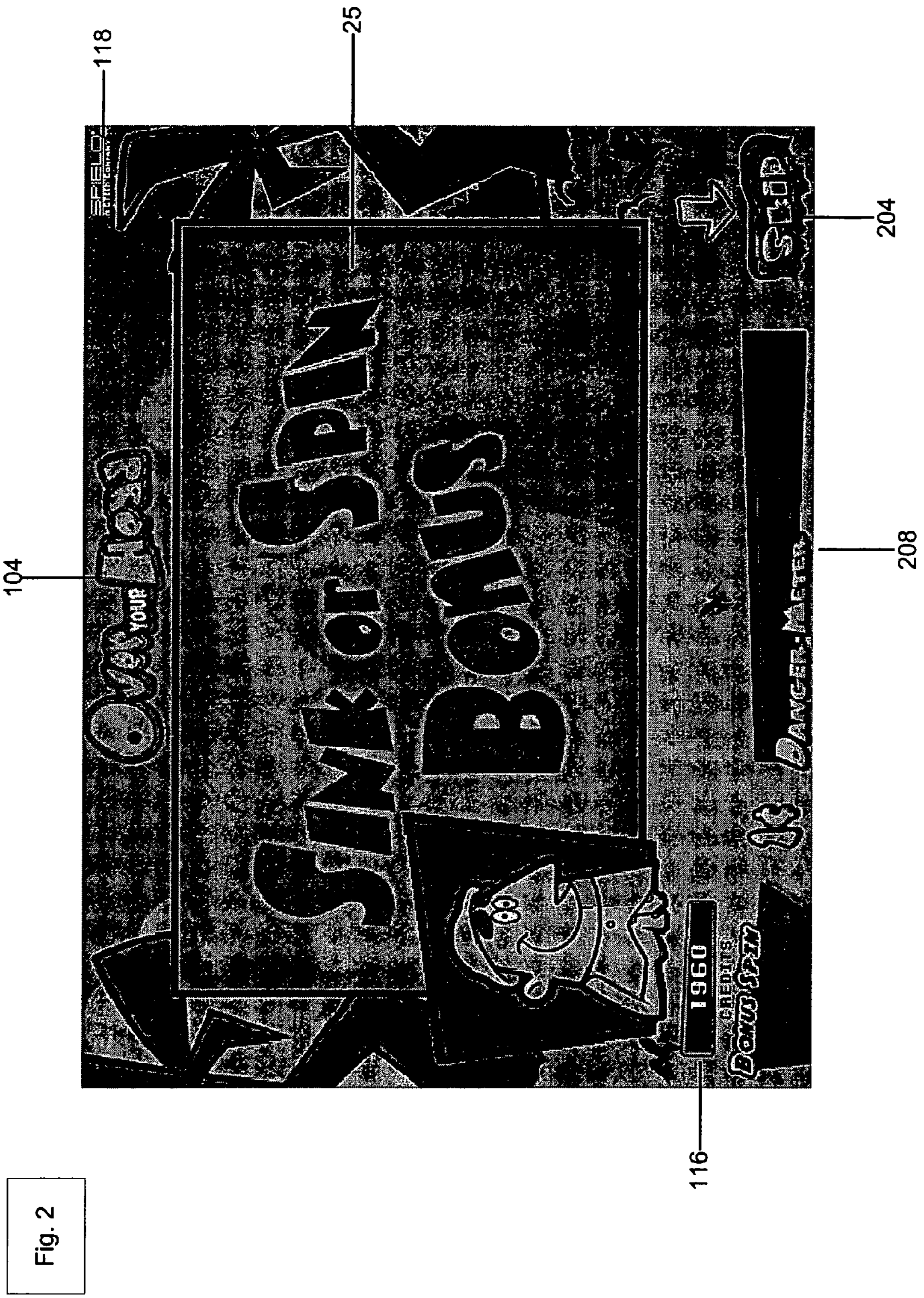
FIG. 2 illustrates an example transition to a bonus game, in accordance with an example embodiment of the present invention.

FIG. 2 illustrates an example transition to a bonus game, in accordance with an example embodiment of the present invention. In a basic game, a transition may be displayed to a player after the start-bonus outcome has occurred but before the bonus game is played. After a start-bonus outcome in the basic game occurs as depicted in FIG. 1, there may be a transition screen 25 displayed. The transition screen 25 may include visually attractive graphics and animations. The transition screen 25 may be a sequence transitioning from the basic game to the bonus game. The transition screen 25 may display a set of rules applicable to the bonus game.

Winnings in a bonus game may be multiplied by a multiplier. The multiplier may vary as the bonus game progresses. The multiplier may be displayed by a multiplier indicator 208. The transition screen 25 may include a multiplier indicator 208. The multiplier indicator 208 may be grayed out in FIG. 2 because no multiplier is available during a transition sequence from a basic game to the bonus game.

The transition screen 25 may include a skip button 204. The skip button 204 may receive an input from the player indicating the player's desire to skip the transition screen 25.

The transition screen 25 may be accompanied by the game title 104, the manufacturer logo 118 and the credits remaining indicator 116 as depicted in FIG. 1.

Figure 3:
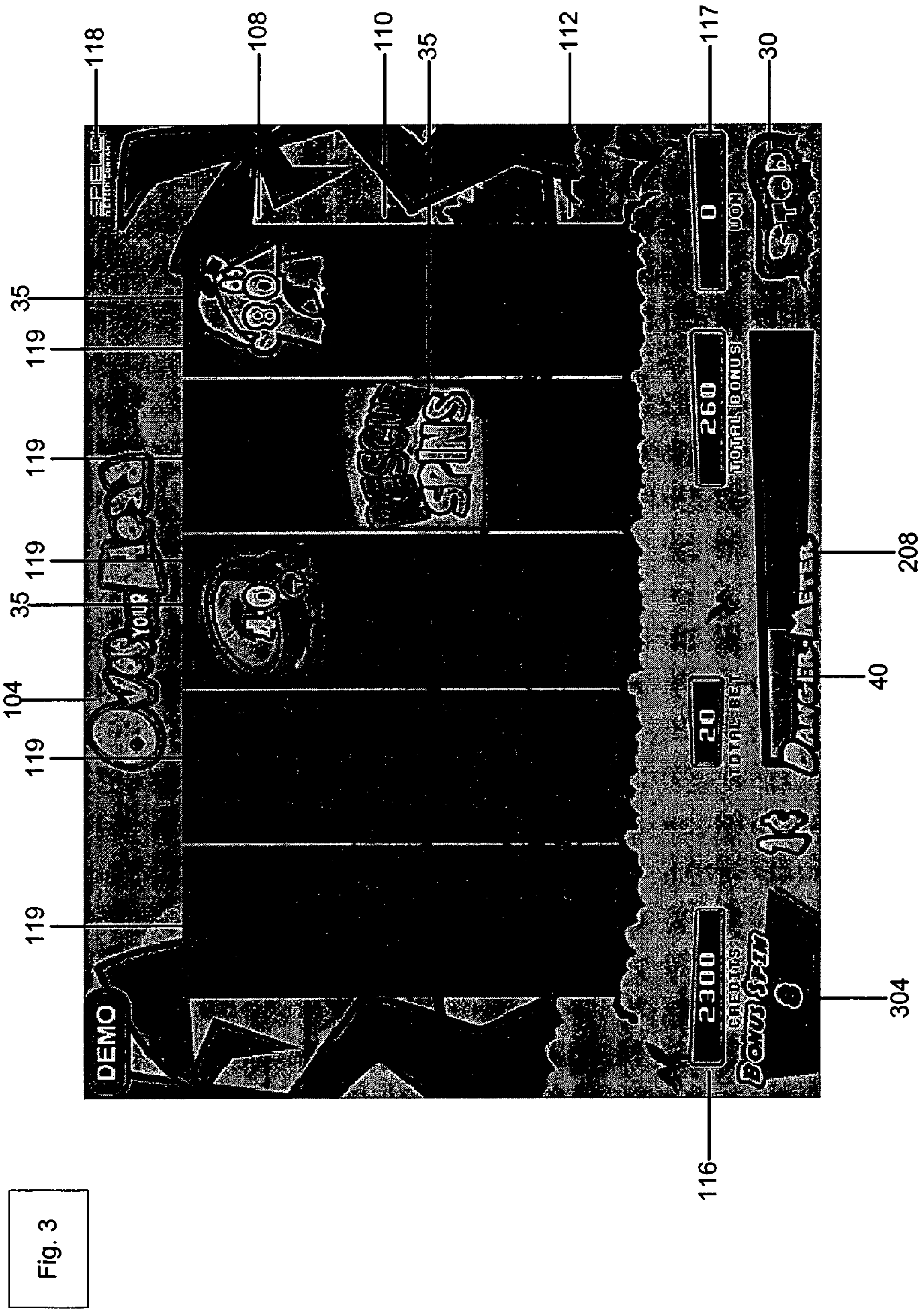
FIG. 3 illustrates a first example bonus game spin result, in accordance with an example embodiment of the present invention.

FIG. 3 illustrates a first example bonus game spin result, in accordance with an example embodiment of the present invention. A spin result in the bonus game may include a plurality of symbols displayed in a plurality of symbol positions. For example, the symbol positions may be displayed in rows and columns. There may be three rows of symbol positions 108, 110 and 112. Each row of symbol positions may include a plurality of symbol positions arranged side by side. The symbol positions may be arranged into columns of symbol positions 119. For example, there may be three rows and five columns of symbol positions, for a total of fifteen symbol positions.

A screen displaying the bonus game spin result may replace some previous inputs. For example, a display of the bonus game spin result may show that the set of inputs 120 depicted in FIG. 1 has been replaced by a stop button 30. Free spins are free to the player and no other interactivity is required. A symbol may be present in any one of the number of symbol positions. In FIG. 3, there are symbols 35 in three of the reels. There may be a plurality of available symbols. Different symbols may have different values and different pre-determined rules affecting their value.

The bonus game may include a variety of variables that affect the value of a prize awarded. For example, the bonus game may include a prize multiplier. The prize multiplier may be a multiplier used to determine a prize to be awarded. For example, the prize multiplier may be indicated by a prize multiplier meter 40. The prize multiplier meter 40 may highlight the current multiplier. In FIG. 3, the multiplier is 1×, meaning the prize will be multiplied by 1 (i.e., the prize amount is not increased) with the current three rows of symbol positions.

The bonus game may include other status indicators in the game. For example, the display may also include a free spin counter 304. The free spin counter 304 may indicate how many free spins a player has executed in the bonus game. In one embodiment, a player may be allowed to continue executing free spins until a game end condition occurs. This may allow a theoretically variable number of free spins.

For example, the free spin counter 304 may function as a history for the bonus game by indicating how many free spins has been executed. For example, the free spin counter 304 may increase player excitement by indicating how many free spins the player has achieved.

Alternatively, a number of free spins remaining may be, for example, a fixed number each time a bonus game begins or a variable number depending on a variety of factors. For example, factors may include the start-bonus outcome or a wager placed by the player.

The display may be accompanied by the game title 104, the manufacturer logo 118, the win amount indicator 117 and the credits remaining indicator 116 as depicted in FIG. 1. The display may also be accompanied by the multiplier indicator 208.

Figure 4:
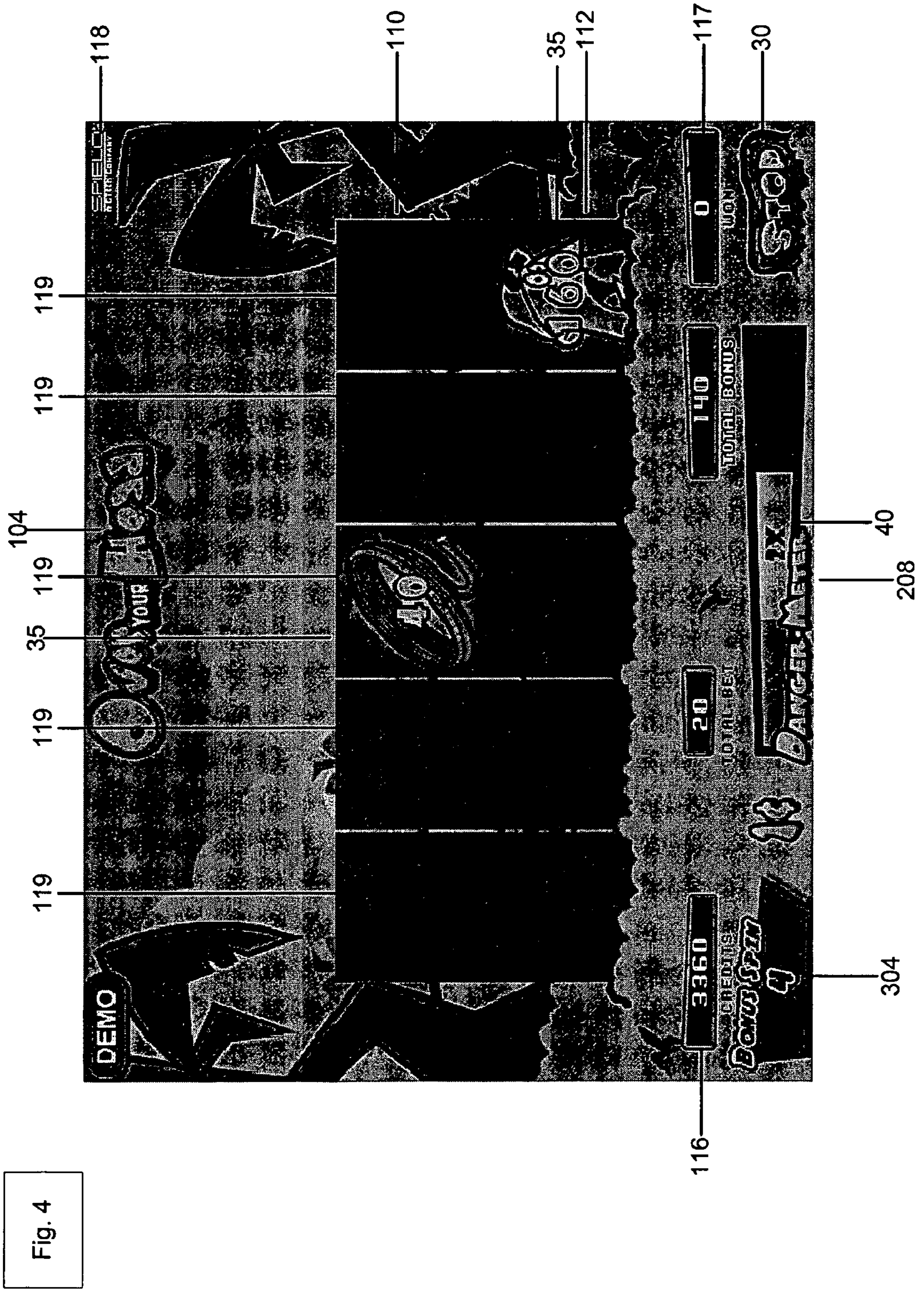
FIG. 4 illustrates a second example bonus game spin result, in accordance with an example embodiment of the present invention.

FIG. 4 illustrates a second example bonus game spin result, in accordance with an example embodiment of the present invention. A second trigger condition may reduce the number of symbol positions available. If the symbol positions are arranged into rows, the number of symbol positions may be reduced by removing a row. In an alternative embodiment, the number of symbol positions may be reduced by removing a column 119. In FIG. 4, only two rows of symbol positions remain. This may occur after a second trigger condition is met, thus reducing the number of rows of symbol positions. Rows 110 and 112 may remain. Symbols 35 may be displayed on the remaining rows 110 and 112. The prize multiplier meter 40 may show that the current multiplier for the bonus game is at 2×, meaning the prize amount is doubled. The prize multiplier meter 40 may be highlighted at the 2× level to indicate the current multiplier.

For example, the second trigger condition may be may be a particular spin result such as a combination of symbols 35. A spin result may either award a prize or not award a prize. Alternatively, the second trigger condition may be a special symbol 35 being displayed in a symbol position.

The display may be accompanied by the game title 104, the manufacturer logo 118, the win amount indicator 117 and the credits remaining indicator 116 as depicted in FIG. 1. The display may also be accompanied by the multiplier indicator 208 as depicted in FIG. 3. The display may also be accompanied by the free spin counter 304 and a stop button 30 as depicted in FIG. 3.

Figure 5:
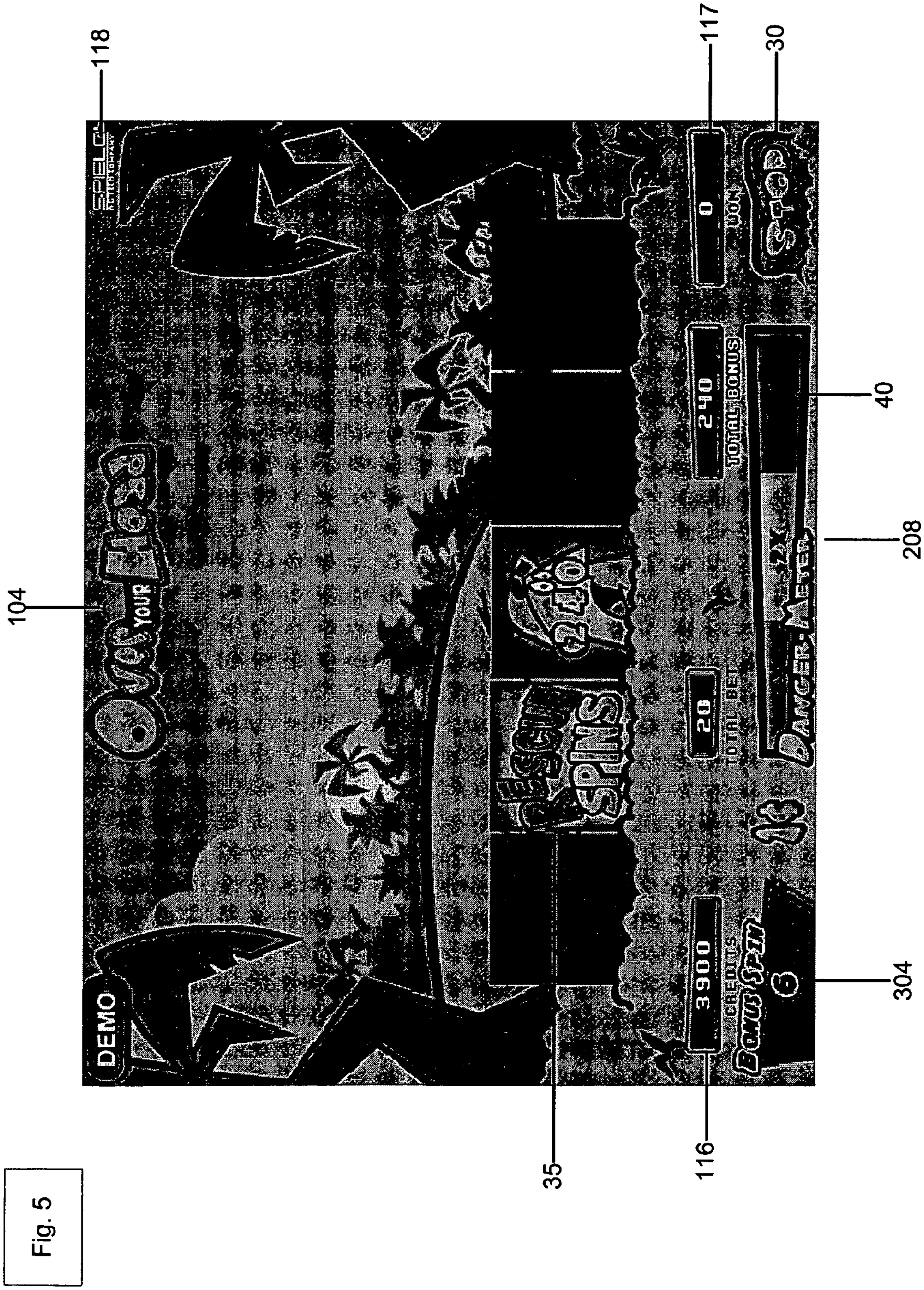
FIG. 5 illustrates a third example bonus game spin result, in accordance with an example embodiment of the present invention.

FIG. 5 illustrates a third example bonus game spin result, in accordance with an example embodiment of the present invention. In FIG. 5, only one row of symbol positions 112 remains. The multiplier meter 40 shows a multiplier of 3×. The 3× multiplier may be highlighted, meaning the prize amount will be tripled. For example, the multiplier may increase as the number of symbol positions decrease and increase as the number of symbol positions increase. The "Rescue Spins" symbol 35 indicates that the reels will be returned to the original position upon entering the bonus. Alternatively, the "Rescue Spins" symbol 35 may indicate that a row of symbol positions will be added.

Alternatively, an end game condition may be triggered. The end game condition may be having no rows of symbol positions remaining or having no columns 119 of symbol positions remaining. For example, if the second trigger condition is again triggered, the last row of symbol positions would be removed and there would be no rows of symbol positions remaining. The end game condition may end the bonus game when triggered. For example, a "game over" may be displayed (not depicted) and the player returned to the basic game.

The display may be accompanied by the game title 104, the manufacturer logo 118, the win amount indicator 117 and the credits remaining indicator 116 as depicted in FIG. 1. The display may also be accompanied by the multiplier indicator 208 as depicted in FIG. 3. The display may also be accompanied by the free spin counter 304 and a stop button 30 as depicted in FIG. 3.

Figure 6:
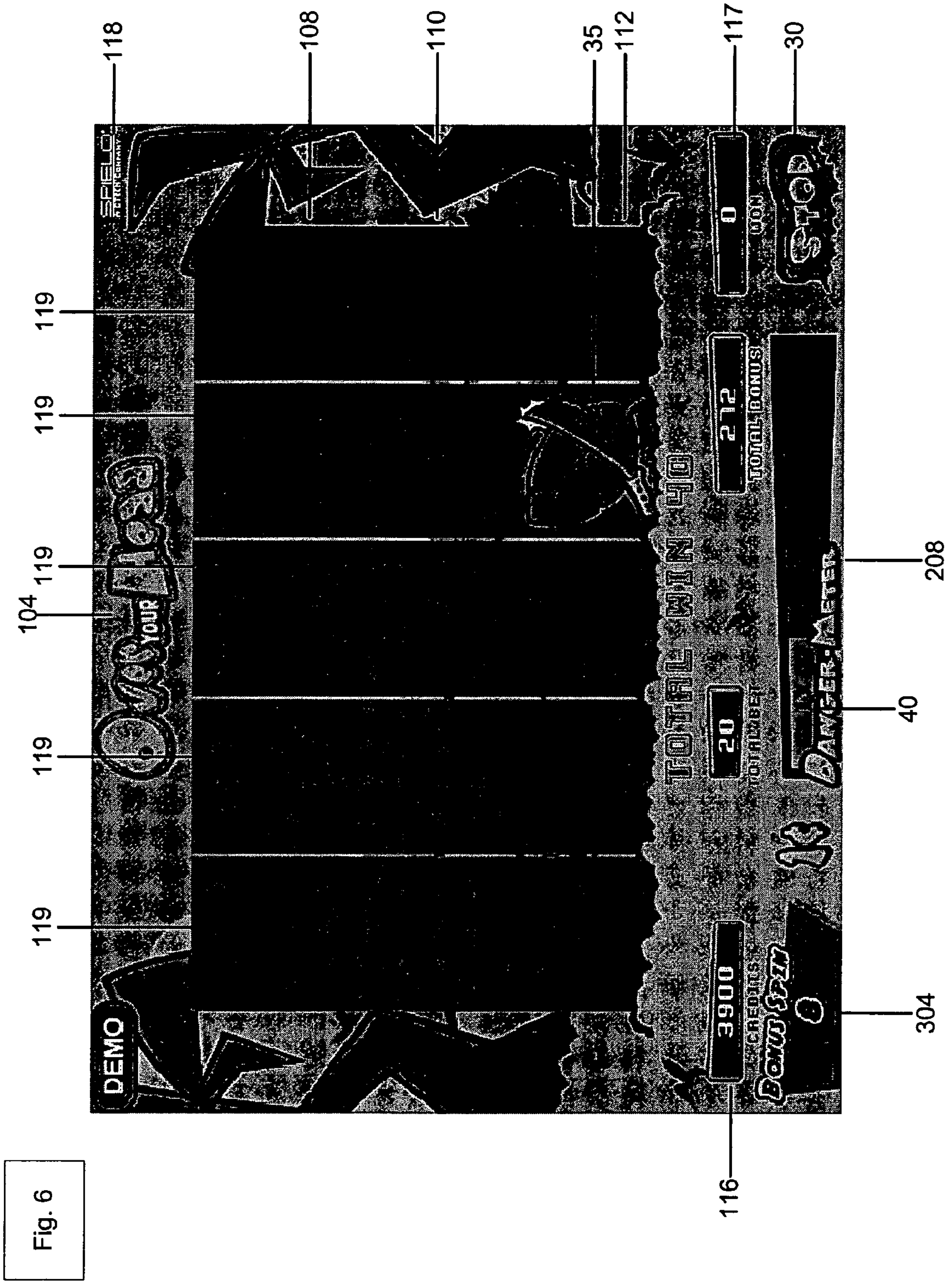
FIG. 6 illustrates a fourth example bonus game spin result, in accordance with an example embodiment of the present invention.

FIG. 6 illustrates a fourth example bonus game spin result, in accordance with an example embodiment of the present invention. A first trigger condition may be triggered, adding a row or a number of rows of symbol positions. For example, the first trigger condition may be a particular spin result such as a combination of symbols 35. A spin result may either award a prize or not award a prize. Alternatively, the first trigger condition may be displaying a fixed number of spin results or some other event in the bonus game.

The restored reels are shown in FIG. 6, and the free spins continue until all three levels have played through and the rows of symbol positions have been removed. Rows 108, 110 and 112 may be available. The symbol positions may also be arranged into columns 119. The multiplier meter 40 may show a current multiplier of 1×. The 1× multiplier may be highlighted, indicating the prize amount will not be increased.

The display may be accompanied by the game title 104, the manufacturer logo 118, the win amount indicator 117 and the credits remaining indicator 116 as depicted in FIG. 1. The display may also be accompanied by the multiplier indicator 208 as depicted in FIG. 3. The display may also be accompanied by the free spin counter 304 and a stop button 30 as depicted in FIG. 3.

It will be appreciated that the symbol positions may be arranged in any shape and is not limited to a grid. For example, the symbol positions may be arranged in a pyramid, a circle, a triangle, any other geometric shape or any other arrangement.

Figure 7:
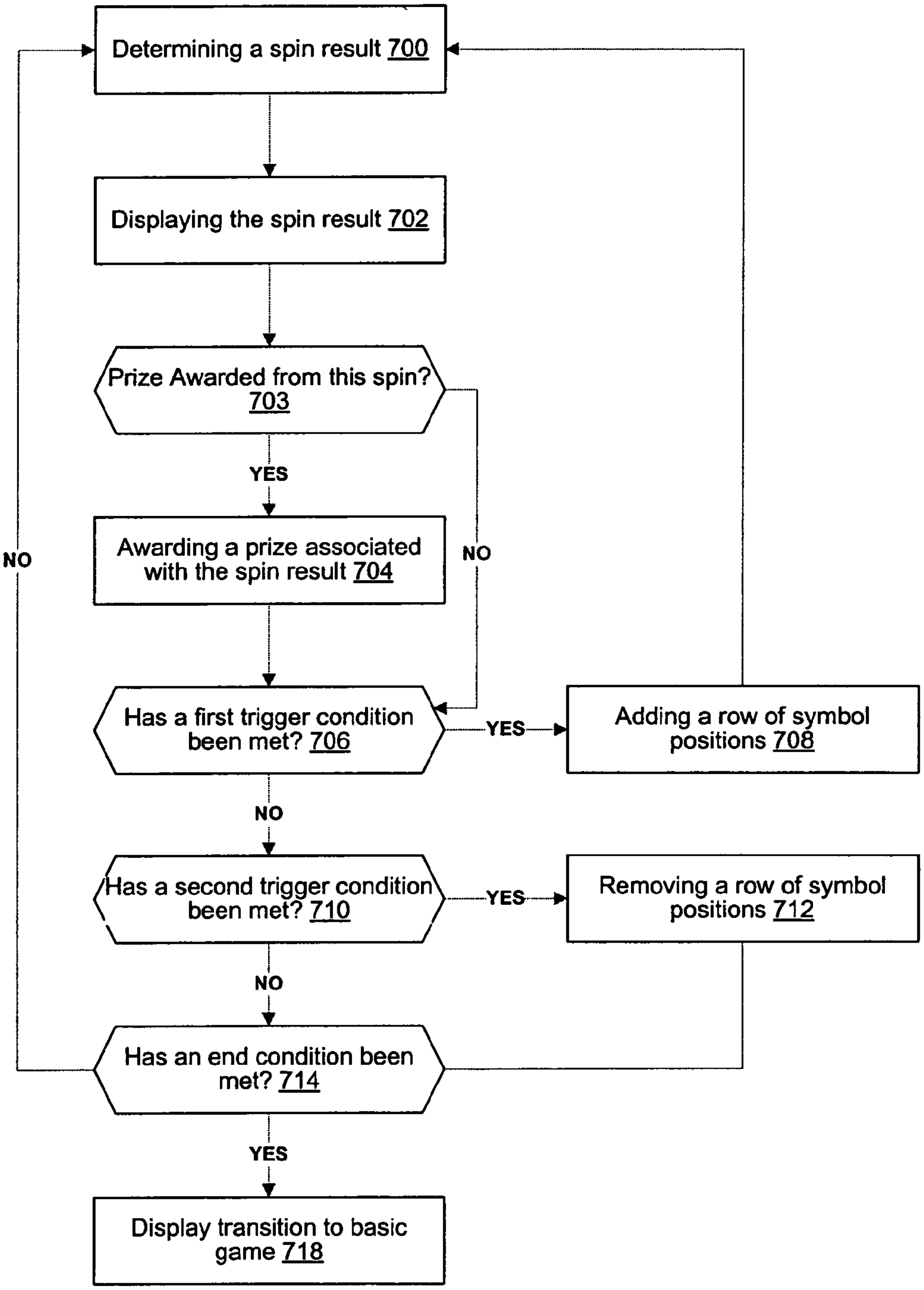
FIG. 7 illustrates a first example procedure for conducting a wagering game, in accordance with an example embodiment of the present invention.

FIG. 7 illustrates a first example procedure for conducting a wagering game, in accordance with an example embodiment of the present invention. In 700, a spin result may be determined. A spin result may be a result that is displayed to a player on a video game terminal. For example, the spin result may be symbols and their associated positions when displayed. The spin result may also be associated with a prize.

The video game terminal may be configured to simulate a slot machine. For example, the video game terminal may include a viewable display area and input devices. The viewable display area may display a number of columns of symbol positions, each symbol position configured to depict a symbol. The columns of symbol positions may be configured, to simulate a spinning reel on a slot machine. The columns of symbol positions may arrange into a number of rows. As depicted in FIG. 1, there are three rows of symbol positions.

The spin result may be pre-determined before the player begins playing the wagering game or as the player plays the wagering game. If the spin result is pre-determined, the spin result may be stored in a prize table as depicted in FIGS. 11*a* and 11*b*. If the spin result is determined as the player plays the wagering game, the video game terminal may be configured to randomly determine a spin result and log the results in a prize table as depicted in FIGS. 11*a* and 11*b*.

The spin result may be displayed in 702. The spin result may be displayed on the viewable display area of the video game terminal. For example, the spin result may include a majority of blank symbols and only a minority of depicted symbols.

In 703, the spin result may be checked if it awards a prize. If the spin result awards a prize, the procedure proceeds to 704. If the spin result does not award a prize, the procedure proceeds to 706.

A prize associated with the spin result may be awarded in 704. For example, the associated prize may be determined by looking up the prize table as depicted in FIGS. 11*a* and 11*b*. Alternatively, the associated prize may be determined by comparing the spin result with a set of rules.

In 706, the video game terminal may test whether a first trigger condition has occurred. The first trigger condition may be associated with adding a row of symbol positions to the viewable display area. The first trigger condition may be a particular spin result. For example, the first trigger condition may be a special symbol displayed in the viewable display area. Alternatively, the first trigger condition may be a number of spins.

A first trigger condition may be disabled if the number of rows of symbol positions exceeds a pre-determined number. For example, the number may be the maximum number of rows of symbol positions able to be displayed in the viewable display area.

If the first trigger condition is triggered, a row of symbol positions may be added to the viewable display area in 708. Alternatively, all rows of symbol positions may be restored. For example, transitioning from FIG. 5 to FIG. 6 depicts restoring all three rows of symbol positions when the first trigger condition occurs. From 708, game play returns to 700.

In 710, a second trigger condition is tested for. If the second trigger condition does not occur, game play proceeds to 714. The second trigger condition may be associated with removing a row of symbol positions from the viewable display area. For example, the second trigger condition may be a particular spin result. Alternatively, the second trigger condition may be a special symbol. If the second trigger condition has occurred, a row of symbol positions may be removed in 712. For example, transitioning from FIG. 4 to FIG. 5 depicts removing a row of symbol positions.

In 714, an end condition is tested for. If the end condition tests true, the bonus game ends in 718. If the end condition does not test true, game play may begin again at 700 with displaying a new spin result. For example, the end condition may be there are no more rows of symbol positions left. This may occur after the second trigger condition occurs multiple times, each time removing a row of symbol positions.

In 718, a game over screen may be displayed (not depicted) and game play returned to the basic game.

Figure 8:
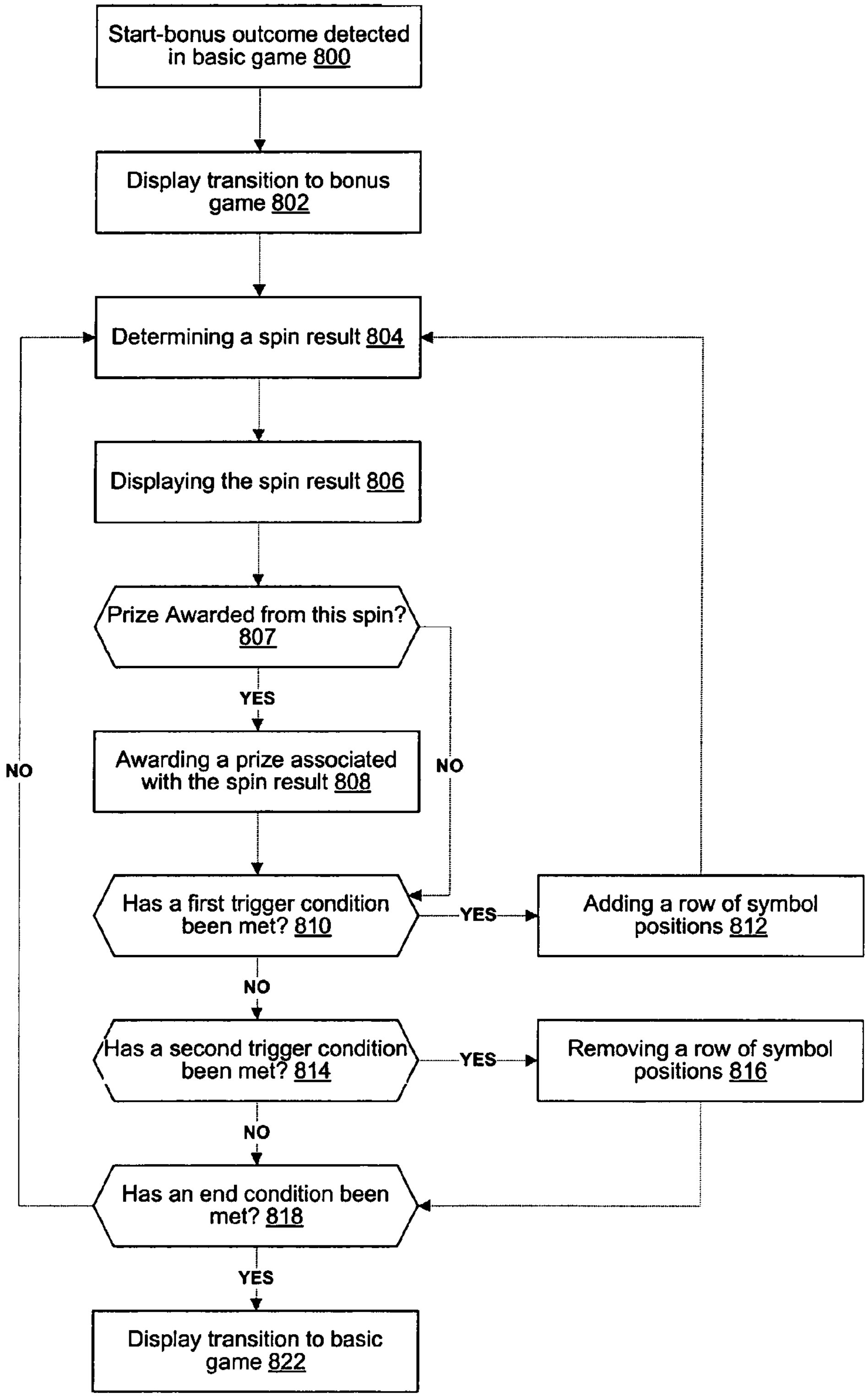
FIG. 8 illustrates a second example procedure for conducting a wagering game, in accordance with an example embodiment of the present invention.

FIG. 8 illustrates a second example procedure for conducting a wagering game, in accordance with an example embodiment of the present invention. In 800, a start-bonus outcome may be detected in a basic game. For example, the start-bonus outcome may be a special symbol being displayed in the viewable display area during the basic game. The basic game may be configured to be played on a video game terminal.

The video game terminal may be configured to simulate a slot machine. For example, the video game terminal may include a viewable display area and input devices. The viewable display area may display a number of columns of symbol positions, each symbol position configured to depict a symbol. The columns of symbol positions may be configured to simulate a spinning reel on a slot machine. The columns of symbol positions may arrange into a number of rows. As depicted in FIG. 1, there are three rows of symbol positions.

The spin result may be pre-determined before the player begins playing the wagering game or as the player plays the wagering game. If the spin result is pre-determined, the spin result may be stored in a prize table as depicted in FIGS. 11*a* and 11*b*. If the spin result is determined as the player plays the wagering game, the video game terminal may be configured to randomly determine a spin result.

In 802, a transition to the bonus game may be displayed. For example, the transition may be a transition screen or a transition sequence. A transition screen may be as depicted in FIG. 2. A transition sequence may be a sequence of screens displayed one after another (not depicted). The transition may include an input allowing the player to skip the transition. The transition may instruct the player in a set of rules for the bonus game.

In 804, a spin result may be determined. A spin result may be a result that is displayed to a player on a video game terminal. For example, the spin result may be symbols and their associated positions when displayed. The spin result may also be associated with a prize.

The spin result may be displayed in 806. The spin result may be displayed on the viewable display area of the video game terminal. For example, the spin result may include a majority of blank symbols and only a minority of depicted symbols.

In 807, the spin result may be checked if it awards a prize. If the spin result awards a prize, the procedure proceeds to 808. If the spin result does not award a prize, the procedure proceeds to 810.

A prize associated with the spin result may be awarded in 808. For example, the associated prize may be determined by looking up the prize table as depicted in FIGS. 11*a* and 11*b*. Alternatively, the associated prize may be determined by comparing the spin result with a set of rules.

In 810, the video game terminal may test whether a first trigger condition has occurred. The first trigger condition may be associated with adding a row of symbol positions to the viewable display area. The first trigger condition may be a particular spin result. For example, the first trigger condition may be a special symbol displayed in the viewable display area. Alternatively, the first trigger condition may be a number of spins.

A first trigger condition may be disabled if the number of rows of symbol positions exceeds a pre-determined number. For example, the number may be the maximum number of rows of symbol positions able to be displayed in the viewable display area.

If the first trigger condition is triggered, a row of symbol positions may be added to the viewable display area in 812. Alternatively, all rows of symbol positions may be restored. For example, transitioning from FIG. 5 to FIG. 6 depicts restoring all three rows of symbol positions when the first trigger condition occurs. From 812, game play returns to 804.

In 814, a second trigger condition is tested for. If the second trigger condition does not occur, game play proceeds to 818. The second trigger condition may be associated with removing a row of symbol positions from the viewable display area. For example, the second trigger condition may be a particular spin result. Alternatively, the second trigger condition may be a special symbol. If the second trigger condition has occurred, a row of symbol positions may be removed in 816. For example, transitioning from FIG. 4 to FIG. 5 removes a row of symbol positions.

In 818, an end condition is tested for. If the end condition tests true, the bonus game ends in 822. If the end condition does not test true, game play may begin again at 804 with displaying a new spin result. For example, the end condition may be there are no more rows of symbol positions left. This may occur after the second trigger condition occurs multiple times, each time removing a row of symbol positions.

In 822, a game over screen may be displayed (not depicted) and game play returned to the basic game.

Figure 9:
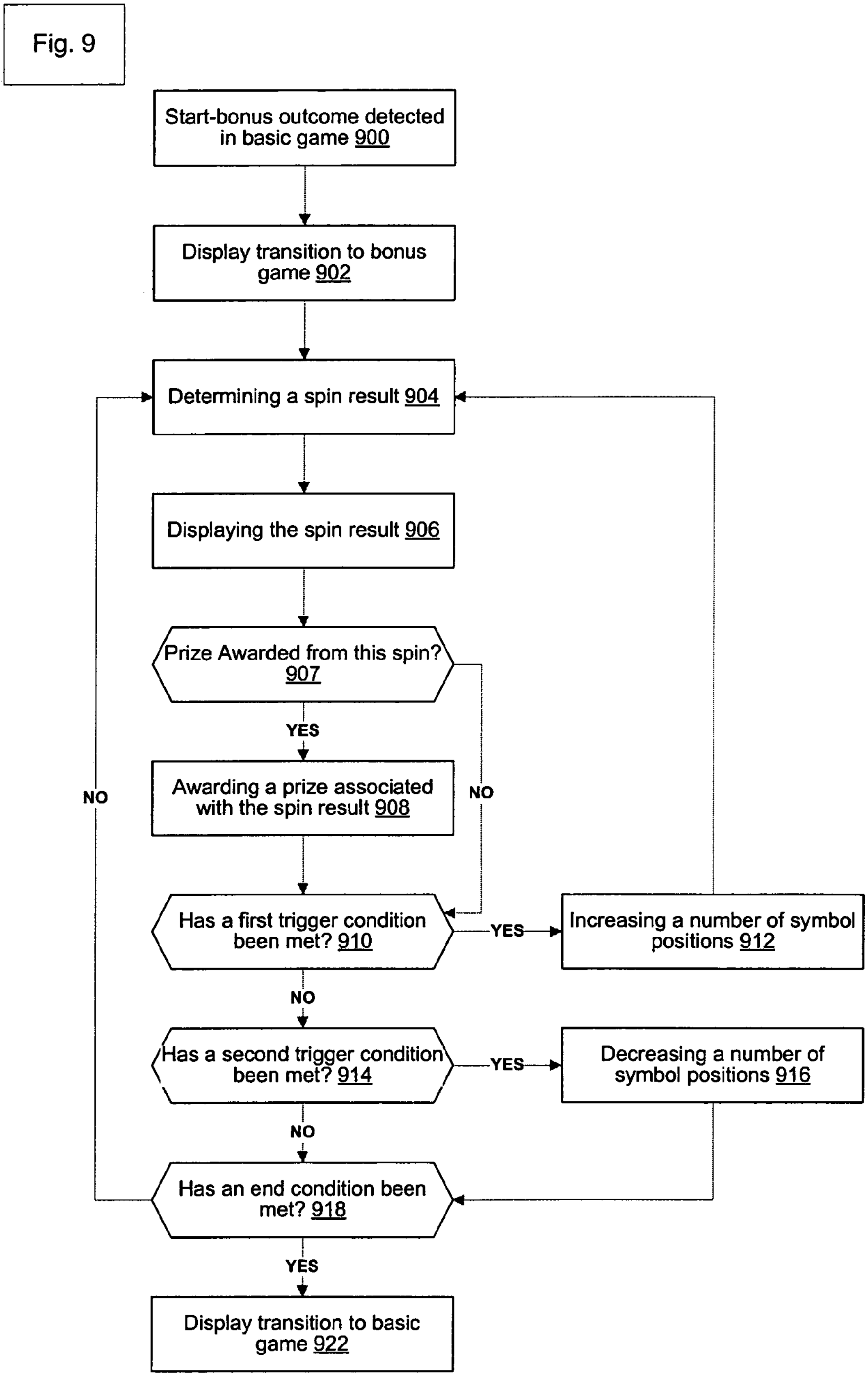
FIG. 9 illustrates a third example procedure for conducting a wagering game, in accordance with an example embodiment of the present invention.

FIG. 9 illustrates a third example procedure for conducting a wagering game, in accordance with an example embodiment of the present invention. In 900, a start-bonus outcome may be detected in a basic game. For example, the start-bonus outcome may be a special symbol being displayed in the viewable display area during the basic game. The basic game may be configured to be played on a video game terminal.

The video game terminal may be configured to simulate a slot machine. For example, the video game terminal may include a viewable display area and input devices. The viewable display area may display a number of symbol positions, each symbol position configured to depict a symbol The spin result may be pre-determined before the player begins playing the wagering game or as the player plays the wagering game. If the spin result is pre-determined, the spin result may be stored in a prize table as depicted in FIGS. 11*a* and 11*b*. If the spin result is determined as the player plays the wagering game, the video game terminal may be configured to randomly determine a spin result.

In 902, a transition to the bonus game may be displayed. For example, the transition may be a transition screen or a transition sequence. A transition screen may be as depicted in FIG. 2. A transition sequence may be a sequence of screens displayed one after another (not depicted). The transition may include an input allowing the player to skip the transition. The transition may instruct the player in a set of rules for the bonus game.

In 904, a spin result may be determined. A spin result may be a result that is displayed to a player on a video game terminal. For example, the spin result may be symbols and their associated positions when displayed. The spin result may also be associated with a prize.

The spin result may be displayed in 906. The spin result may be displayed on the viewable display area of the video game terminal. For example, the spin result may include a majority of blank symbols and only a minority of depicted symbols.

In 907, the spin result may be checked if it awards a prize. If the spin result awards a prize, the procedure proceeds to 908. If the spin result does not award a prize, the procedure proceeds to 910.

A prize associated with the spin result may be awarded in 908. For example, the associated prize may be determined by looking up the prize table as depicted in FIGS. 11*a* and 11*b*. Alternatively, the associated prize may be determined by comparing the spin result with a set of rules.

In 910, the video game terminal may test whether a first trigger condition has occurred. The first trigger condition may be associated with adding symbol positions to the viewable display area. The first trigger condition may be a particular spin result. For example, the first trigger condition may be a special symbol displayed in the viewable display area. Alternatively, the first trigger condition may be a number of spins.

A first trigger condition may be disabled if the number symbol positions exceeds a pre-determined number. For example, the number may be the maximum number of symbol positions able to be displayed in the viewable display area.

If the first trigger condition is triggered, symbol positions may be added to the viewable display area in 912. Alternatively, symbol positions may be restored. From 912, game play returns to 904.

In 914, a second trigger condition is tested for. If the second trigger condition does not occur, game-play proceeds to 918. The second trigger condition may be associated with removing symbol positions from the viewable display area. For example, the second trigger condition may be a particular spin result. Alternatively, the second trigger condition may be a special symbol. If the second trigger condition has occurred, symbol positions may be removed in 916.

In 918, an end condition is tested for. If the end condition tests true, the bonus game ends in 922. If the end condition does not test true, game play may begin again at 904 with displaying a new spin result. For example, the end condition may be there are no more rows of symbol positions left. This may occur after the second trigger condition occurs multiple times, each time removing a row of symbol positions.

In 922, a game over screen may be displayed (not depicted) and game play returned to the basic game.

Figure 10:
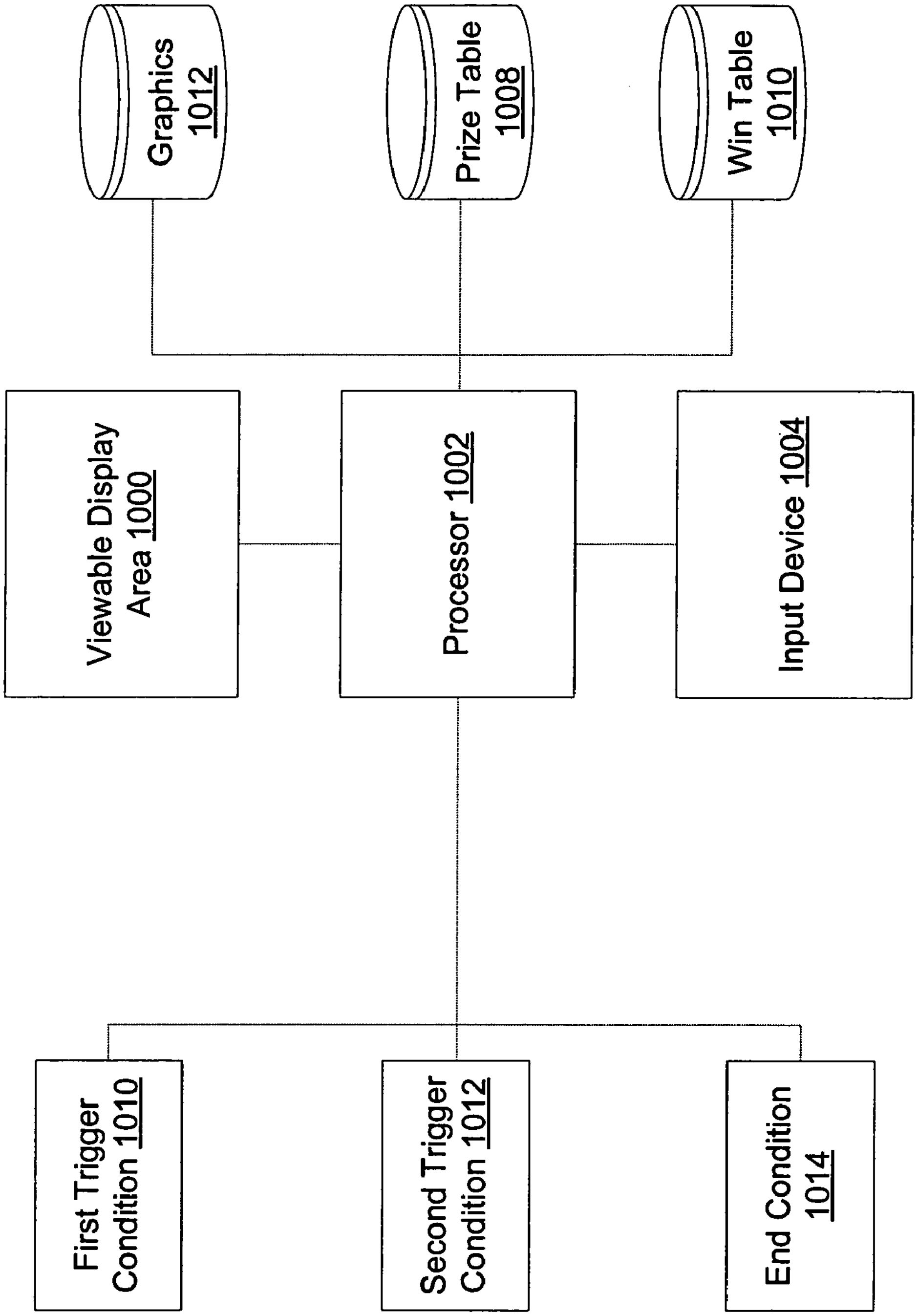
FIG. 10 illustrates an example system for conducting a wagering game, in accordance with an example embodiment of the present invention.

FIG. 10 illustrates an example system for conducting a wagering game, in accordance with an example embodiment of the present invention. The system may include a viewable display area 1000. The viewable display area 1000 may display a variable number of rows of symbol positions. The viewable display area 1000 may be operably connected to a processor 1002. The processor 1002 may be a conventional general purpose processing unit. The processor 1002 may control the viewable display area 1000 and receive inputs from input device 1004. For example, the input device 1004 may be a pointer device, a keyboard or a series of buttons configured to allow a user to input choices and information.

The processor 1002 may access a prize table 1008. For example, the prize table 1008 may be stored on a hard disk local to the processor 1002. For example, the prize table may be as depicted in FIGS. 11*a* and 11*b*.

Figure 12:
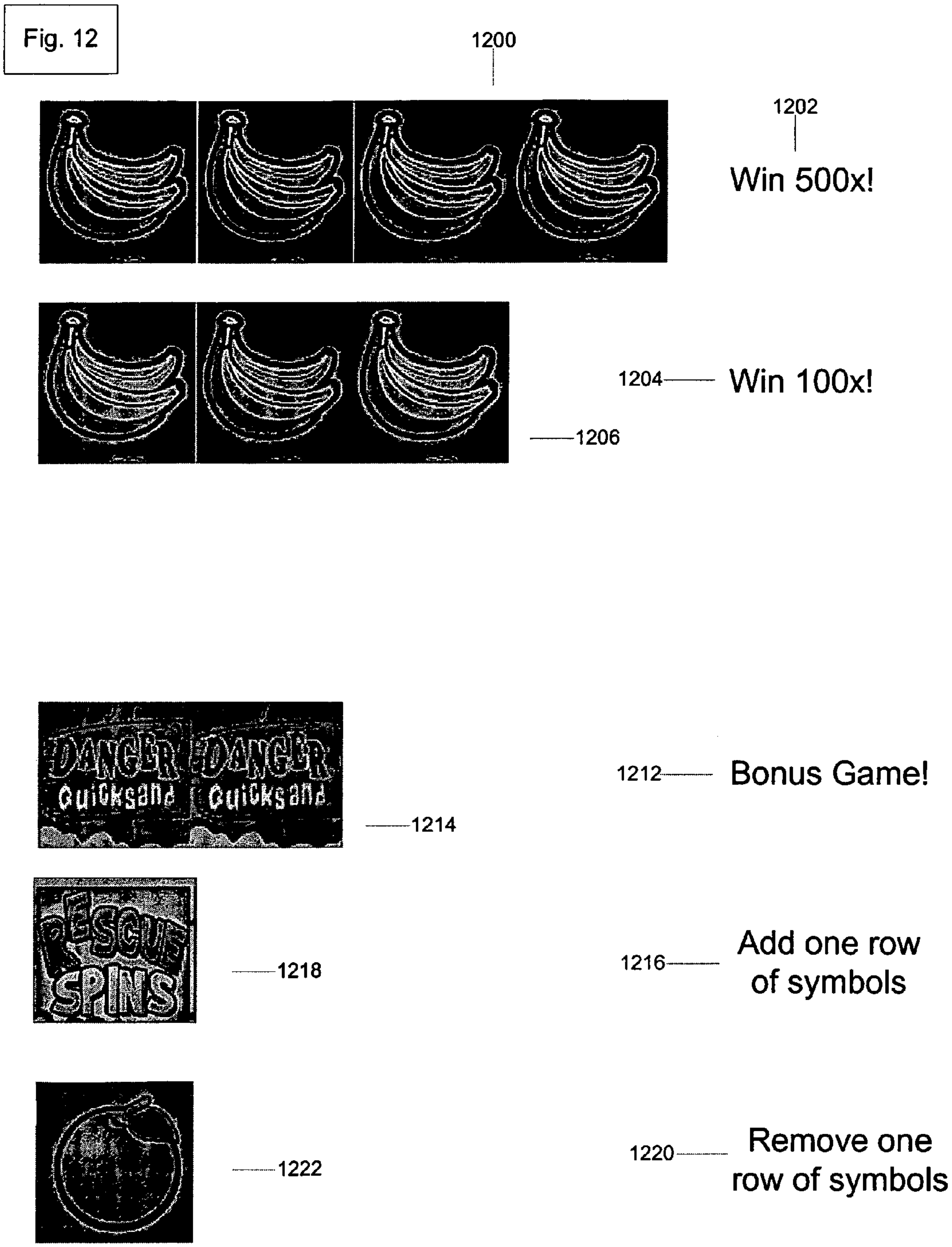
FIG. 12 illustrates an example embodiment of a win table, according to an example embodiment of the present invention.

The processor 1002 may access a win table 1010. For example, the win table 1010 may be stored on a hard disk local to the processor 1002. For example, the win table 1010 may be as depicted in FIG. 12.

The processor 1002 may access a graphics file 1012. For example, the graphics file 1012 may be stored on a hard disk local to the processor 1002. For example, the graphics file 1012 may include graphics to be displayed on the viewable display area 1000.

The processor 1002 may be configured with a first trigger condition 1010. For example, the processor 1002 may be configured to increase the number of rows of symbol positions on the viewable display area 1000 after an occurrence of first trigger condition 1010.

The processor 1002 may be configured with a second trigger condition 1012. For example, the processor 1002 may be configured to decrease the number of rows of symbol positions on the viewable display area 1000 after an occurrence of second trigger condition 1012.

The processor 1002 may be configured with an end condition 1014. For example, the processor 1002 may be configured to end a bonus game after an occurrence of the end condition 1014.

FIG. 11*a* illustrates an example prize table, in accordance with an example embodiment of the present invention. A prize table 1100 may be stored. The prize table 1100 may include a plurality of records 1102, each record 1102 representing one prize available in the bonus game.

It will be appreciated that the prize table 1100 may be stored in a variety of ways. For example, it may be stored as a tab delimited or comma delimited flat file, in a relational database or another storage method accessible to a lottery host. Each entry 1102 in the prize table 1100 may be associated with a prize in a wagering game. The prize table 1100 may be used for accounting, auditing, or fraud-detection purposes. For example, the prize table 1100 may be checked for abnormally high concentration of prizes being awarded.

FIG. 11*b* illustrates an example embodiment of a prize table entry, according to an example embodiment of the present invention. Each prize table entry may be a record 1102', similar to the records 1102 depicted in FIG. 11*a*. Each record 1102' may contain a variety of information, such as a prize ID 1104. Each prize in the bonus game may be associated with a prize ID 1104. The prize ID 1104 may be an alpha-numeric sequence of characters and may be unique within the bonus game.

The record 1102' may also include a prize description 1106. The prize description 1106 may be an identifier of a prize to be awarded. The identifier may be an alpha-numeric sequence of characters and may be unique within the bonus game. Alternatively, the identifier may be a text description of the prize to be awarded.

The record 1102' may also include a prize amount 1108. The prize amount 1108 may be an amount of currency to be awarded to the player. Alternative prizes may also be available, such as merchandise.

The record 1102' may also include a displayed result 1110. The displayed result 1110 may be a representation of the displayed result displayed to the player. The displayed result 1110 may be pre-determined before the player begins playing, in which case the video game terminal simply retrieves the displayed result 1110 from the record 1102 and displays it. Alternatively, the displayed result 1110 may be determined when the player is playing. In this example embodiment, the displayed result 1110 may be stored in the record 1102 for audit and logging purposes.

The record 1102' may also include a date and time field 1112. The date and time field 1110 may contain the date and time that the prize associated with record 1102' was awarded.

FIG. 12 illustrates an example embodiment of a win table, according to an example embodiment of the present invention. The win table may associate symbol combinations 1200, 1206, 1214, 1218 and 1222 with prizes or outcomes 1202, 1204, 1212, 1216 and 1220 respectively. Each association of a symbol combination and a prize or outcome may be stored as a record. Alternatively, the win table may be stored or displayed in a table form (not depicted) where each record associates a symbol combination with a prize. In addition, each record may include positions of symbols relative to each other and relative to a pay line. For example, a record for symbol combination 1200 may specify that all four banana symbols must line up on a pay line next to each other. Alternatively, the record may not specify a position, and thus a winning combination would be four banana symbols anywhere on the viewable display area.

For example, the symbol combination 1214 may be a start-bonus outcome. Thus, if spin result equals the symbol combination 1214, a bonus game may begin. Similarly, the symbol combinations 1218 and 1222 may result in adding or removing a row of symbol positions from the viewable display area.

It will be appreciated that the win table may be configured in a number of ways. For example, the symbol combinations 1200, 1206, 1218 and 1222 may be changed to other symbol combinations.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A method for conducting a wagering game, comprising:
as part of resolving a single wager, determining a spin result, the spin result including a set of symbols positioned in a plurality of rows of symbol positions;
displaying the spin result on a viewable display area;
awarding a prize associated with the spin result;
responsive to a first trigger condition being met,
adding a row to produce a second larger plurality of rows of symbol positions for at least a second spin during the single wager, the second larger plurality of rows of symbols positions including the plurality of rows of symbol positions, and
decreasing the prize value,
determining a second spin result for each symbol position in the larger plurality of rows of symbol positions, and displaying the second spin result on the viewable display area,
responsive to a second trigger condition being met,
removing the row of symbol positions for at least a subsequent spin during the single wager, and
increasing the prize value; and
ending the wagering game if there are no rows of symbol positions remaining.

2. The method of claim 1, wherein the prize is awarded for having a predetermined symbol displayed in any symbol position.

3. The method of claim 1, wherein the prize is awarded for having a predetermined combination of symbols displayed in any single one of the rows of symbol positions.

4. The method of claim 1, wherein some of the symbol positions in the spin result contain a blank symbol.

5. The method of claim 1, wherein the first trigger condition depends on the spin result.

6. The method of claim 5, wherein the first trigger condition is a spin result awarding a prize.

7. The method of claim 1, wherein the first trigger condition is displaying a pre-determined number of spin results.

8. The method of claim 1, wherein the second trigger condition depends on the second spin result.

9. The method of claim 8, wherein the second trigger condition is the second spin result awarding a prize.

10. The method of claim 8, wherein the second trigger condition is the second spin result not awarding a prize.

11. The method of claim 8, wherein the second trigger condition is a special symbol included in the second spin result.

12. A method of conducting a wagering game, comprising:
conducting a basic wagering game; and
conducting a bonus game within the basic wagering game when a start-bonus outcome is detected in the basic game, the bonus game further comprising,
determining a spin result, the spin result including a set of symbols positioned in a plurality of rows of symbol positions,
displaying the spin result on a viewable display area,
awarding a prize associated with the spin result,
responsive to a first trigger condition being met,
adding a row to produce a second larger plurality of rows of symbol positions for at least a second spin during a single wager, the second larger plurality of rows of symbols positions including the plurality of rows of symbol positions, and
decreasing the prize value,
determining a second spin result for each symbol position in the larger plurality of rows of symbol positions, and displaying the second spin result on the viewable display area,
responsive to a second trigger condition being met,
removing a row of symbol positions for at least a subsequent spin during the single wager, and
increasing the prize value, and
ending the bonus game if there are no rows of symbol positions remaining.

13. A method for conducting a wagering game, comprising:
as part of resolving a single wager, determining a spin result, the spin result including positions of symbols in a number of symbol positions;
displaying the spin result on a viewable display area;
awarding a prize associated with the spin result;
responsive to a first trigger condition being met,
increasing the number of symbol positions for at least a second spin during the single wager, and
decreasing the prize value,
determining a second spin result for each symbol position in the increased plurality of symbol positions;
responsive to a second trigger condition being met,
decreasing the number of symbol positions for at least a subsequent spin during the single wager, and
increasing the prize value, and ending the wagering game when there are no symbol positions remaining.

14. The method of claim 13, wherein the spin result is determined randomly.

15. The method of claim 13, wherein the symbol positions are arranged in rows;

increasing the number of symbol positions further comprises adding a row of symbol positions; and decreasing the number of symbol positions further comprises removing a row of symbol positions.

16. The method of claim 13, wherein the symbol positions are arranged in columns;

increasing the number of symbol positions further comprises adding a column of symbol positions; and decreasing the number of symbol positions further comprises removing a column of symbol positions.

17. The method of claim 13, wherein increasing the number of symbol positions further comprises adding a single symbol position; and decreasing the number of symbol positions further comprises removing a single symbol.

18. A system for conducting a wagering game, comprising:

a viewable display area, the viewable display area configured to display a variable number of symbol positions;

a first trigger condition to increase the number of symbol positions;

a second trigger condition to decrease the number of symbol positions; and a processor, the processor in communication with the viewable display area and configured to, as part of resolving a single wager, determine a spin result, the spin result including positions of symbols in the rows of symbol positions, award a prize associated with the spin result, responsive to the first trigger condition, increase the number of symbol positions for at least a second spin during the single wager and decrease the prize value, responsive to the second trigger condition, decrease the number of symbol positions for at least a subsequent spin during the single wager and increase the prize value, and end the wager game if there are no symbol positions remaining.

19. The system of claim 18, wherein the variable number of symbol positions are arranged into a variable number of rows.

20. The system of claim 18, wherein the variable number of symbol positions are arranged into a variable number of columns of symbol positions, and the columns are animated to simulate reels on a conventional slot machine.

21. The system of claim 18, further comprising, a prize table comprising a plurality of prize table entries, each prize table entry associating a prize to a spin result.

22. The system of claim 18, further comprising, an input device, the input device configured to accept input from a player.

23. The system of claim 18, wherein on occurrence of the first trigger condition, the processor further, determines a second spin result for each symbol position in the larger plurality of rows of symbol positions, and cause the system to display the second spin result on the viewable display area.

24. A system of claim 18, wherein the first trigger condition depends on the spin result.

25. A system of claim 18, wherein the first trigger condition is the spin result awarding a prize.

26. A system of claim 18, wherein the first trigger condition is displaying a pre-determined number of spin results.

27. A system of claim 18, wherein the second trigger condition depends on the spin result.

28. A system of claim 18, wherein the second trigger condition is the spin result awarding a prize.

29. A system of claim 18, wherein the second trigger condition is the spin result not awarding a prize.

30. A system of claim 18, wherein the second trigger condition is a special symbol included in the spin result.

31. A computer-readable medium storing instructions adapted to be executed by a processor, the instructions, when executed, defining a method for conducting a wagering game, the method comprising:

as part of resolving a single wager, determining a spin result, the spin result including a set of symbols positioned in a plurality of rows of symbol positions;

displaying the spin result on a viewable display area;

awarding a prize associated with the spin result;

responsive to a first trigger condition being met, adding a row to produce a second larger plurality of rows of symbol positions for at least a second spin during the single wager, the second larger plurality of rows of symbols positions including the plurality of rows of symbol positions, and decreasing the prize value, determining a second spin result for each symbol position in the larger plurality of rows of symbol positions, displaying the second spin result on the viewable display area, responsive to a second trigger condition being met, removing a row of symbol positions for at least a subsequent spin during the single wager, and increasing the prize value; and ending the wagering game if there is no row of symbol positions remaining.

32. The method of claim 5, wherein the first trigger condition is a special symbol included in the spin result.

33. The system of claim 24, wherein the first trigger condition is a special symbol included in the spin result.

34. The method of claim 1, wherein the prize value is determined, in part, by a multiplier.

35. The method of claim 12, wherein the prize value is determined, in part, by a multiplier.

36. The method of claim 13, wherein the prize value is determined, in part, by a multiplier.

37. The system of claim 18, wherein the prize value is determined, in part, by a multiplier.

38. The computer-readable medium of claim 31, wherein in the method, the prize value is determined, in part, by a multiplier.

* * * * *